(12) United States Patent
Das et al.

(10) Patent No.: US 11,054,889 B2
(45) Date of Patent: Jul. 6, 2021

(54) DYNAMIC POWER MANAGEMENT

(71) Applicant: Cisco Technology, Inc., San Jose, CA (US)

(72) Inventors: Torsha Das, Cupertino, CA (US); Jay Yoo, Milpitas, CA (US); Tuchih Tsai, Cupertino, CA (US); Kabiraj Sethi, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/826,838

(22) Filed: Mar. 23, 2020

(65) Prior Publication Data

US 2020/0241627 A1 Jul. 30, 2020

Related U.S. Application Data

(62) Division of application No. 15/662,574, filed on Jul. 28, 2017, now Pat. No. 10,599,209.

(51) Int. Cl.
*G06F 1/32* (2019.01)
*G06F 1/3287* (2019.01)
*H04L 12/10* (2006.01)
*G06F 1/3296* (2019.01)
*G06F 1/3206* (2019.01)

(52) U.S. Cl.
CPC .......... *G06F 1/3287* (2013.01); *G06F 1/3206* (2013.01); *G06F 1/3296* (2013.01); *H04L 12/10* (2013.01)

(58) Field of Classification Search
CPC ..................................... G06F 9/44; G06F 1/32
See application file for complete search history.

(56) References Cited

U.S. PATENT DOCUMENTS

| | | | |
|---|---|---|---|
| 10,212,248 B2 | 2/2019 | Ayyagari | |
| 2001/0043050 A1 | 11/2001 | Fisher, Jr. | |
| 2007/0004467 A1 | 1/2007 | Chary | |
| 2009/0138692 A1* | 5/2009 | Duda | H04L 49/65 713/1 |
| 2010/0274943 A1 | 10/2010 | Mahadevan | |
| 2012/0216055 A1* | 8/2012 | Dumas | G06F 1/26 713/320 |
| 2013/0162438 A1* | 6/2013 | Wu | G06F 11/3006 340/670 |
| 2016/0378157 A1* | 12/2016 | Jinaraj | G06F 1/266 713/300 |
| 2018/0359194 A1 | 12/2018 | Yang | |
| 2019/0094951 A1* | 3/2019 | Mori | H02M 3/04 |

* cited by examiner

*Primary Examiner* — Keshab R Pandey
(74) *Attorney, Agent, or Firm* — Merchant & Gould P.C.

(57) ABSTRACT

Power supply efficiency may be provided. First, a total power supply capacity may be determined comprising a sum of a plurality of supply capacities respectively corresponding to a plurality of power supplies serving a plurality of components. Next, a load value corresponding to the plurality of components may be determined. A number of the plurality of power supplies may then be powered down. The number of power supplies powered down may comprise a value that may cause a remaining number of the plurality of power supplies serving the plurality of components to operate within an efficiency range.

20 Claims, 5 Drawing Sheets

US 11,054,889 B2

DYNAMIC POWER MANAGEMENT

RELATED APPLICATIONS

This application is a divisional of co-pending U.S. patent application Ser. No. 15/662,574 filed on Jul. 28, 2017, which is incorporated by reference herein.

TECHNICAL FIELD

The present disclosure relates generally to power system management.

BACKGROUND

A power supply is an electronic device that supplies electric energy to an electrical load. The primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices as well as commercial and industrial data and control systems.

Power supplies have a power input that receives energy from the energy source, and a power output that delivers energy to the load. In most power supplies, the power input and output consist of electrical connectors or hardwired circuit connections, though some power supplies employ wireless energy transfer in lieu of galvanic connections for the power input or output. Some power supplies have other types of inputs and outputs as well, for functions such as external monitoring and control.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
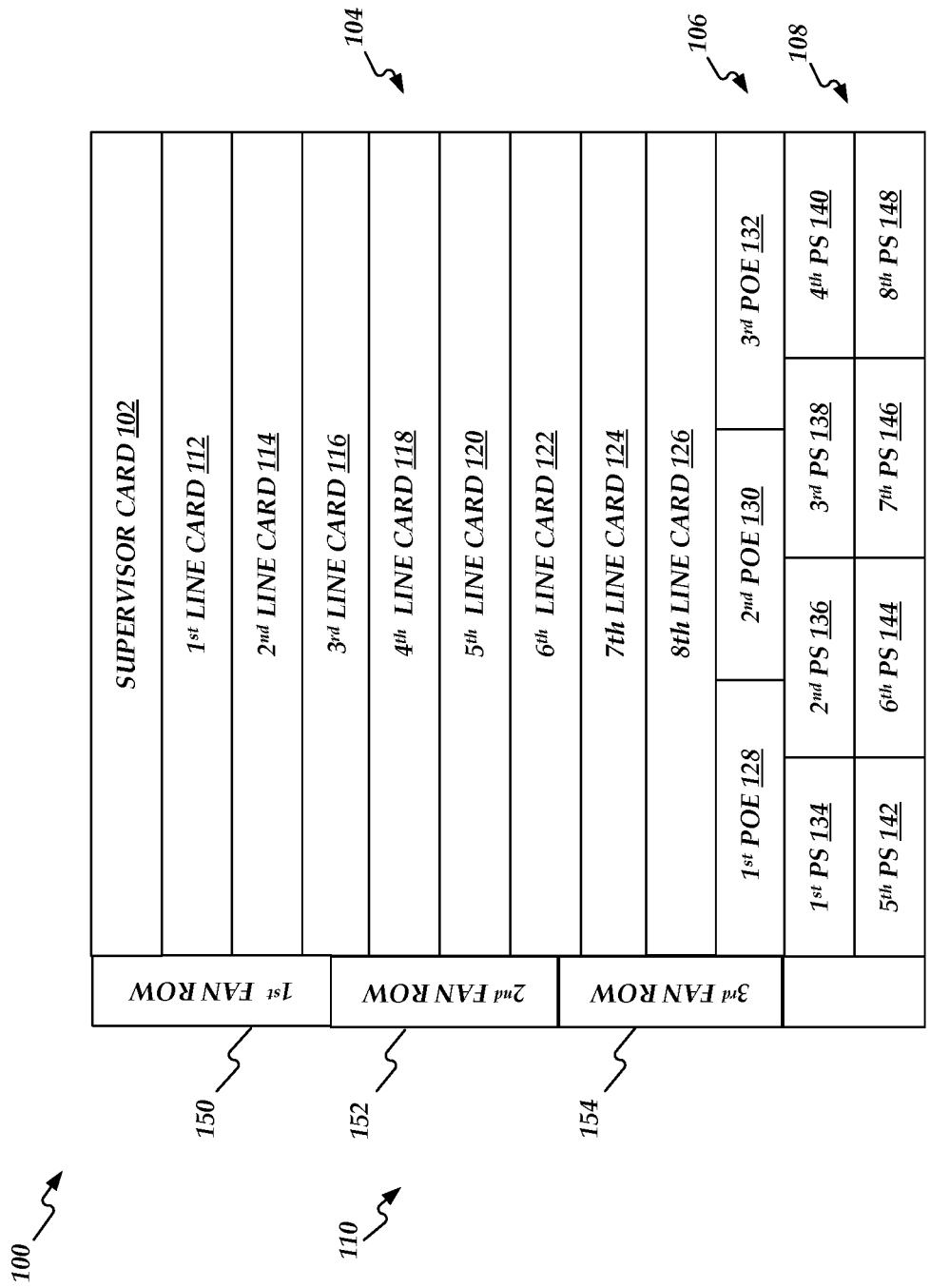
FIG. 1 is a block diagram of a modular chassis system.

Power supply efficiency may be provided. First, a total power supply capacity may be determined comprising a sum of a plurality of supply capacities respectively corresponding to a plurality of power supplies serving a plurality of components. Next, a load value corresponding to the plurality of components may be determined. A number of the plurality of power supplies may then be powered down. The number of power supplies powered down may comprise a value that may cause a remaining number of the plurality of power supplies serving the plurality of components to operate within an efficiency range.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

Embodiments of the disclosure may provide a power management process in a modular chassis system. In the power management process, system components (e.g., supervisor cards, fan trays, line cards, Power over Ethernet connections) may be grouped and assigned a priority based on their functional criticality. The power management process may provide a dynamic and fine granularity of control over power budget distribution and turning OFF/ON of individual system component to achieve, for example, higher reliability in times of power supply online insertion and removal (OIR). Along with dynamic power control, the power management process may also provide efficient operation of the power supplies by turning them off or on based on dynamic line card, Power over Ethernet OIR, and thermal and environmental feedback.

FIG. 1 is a block diagram of a modular chassis system 100. As shown in FIG. 1, modular chassis system 100 may comprise a supervisor card 102, a plurality of line cards 104, a plurality of Power over Ethernet (PoE) connectors 106, a plurality of power supplies 108, and a plurality of fan rows 110. Plurality of line cards 104 may comprise a first line card 112, a second line card 114, a third line card 116, a fourth line card 118, a fifth line card 120, a sixth line card 122, a seventh line card 124, and an eighth line card 126. Plurality of Power over Ethernet (PoE) connectors 106 may comprise a first PoE connector 128, a second PoE connector 130, and a third PoE connector 132. Plurality of power supplies 108 may comprise a first power supply 134, a second power supply 136, a third power supply 138, a fourth power supply 140, a fifth power supply 142, a sixth power supply 144, a seventh power supply 146, and an eighth power supply 148. Plurality of fan rows 110 may comprise a first fan row 150, a second fan row 152, and a third fan row 154.

Plurality of power supplies 108 may feed a power supply bus. Supervisor card 102, plurality of line cards 104, plurality of Power over Ethernet (PoE) connectors 106, and plurality of fan rows 110 my draw power from plurality of power supplies 108 through the power supply bus. Consistent with embodiments of the disclosure, at any time, a plurality of components may be fed from the power supply bus. The plurality of components may comprise any combination of supervisor card 102, plurality of line cards 104, plurality of Power over Ethernet (PoE) connectors 106, and plurality of fan rows 110.

A computing device may implement a power management process for modular chassis system 100. The computing device may comprise a computing device 500 as described in greater detail below with respect to FIG. 5. For example, computing device 50 may determine, at any given time, which of plurality of power supplies 108 may feed the power supply bus and which of the plurality of components may draw power from the power supply bus as described in greater detail below with respect to FIG. 2, FIG. 3, and FIG. 4.

Figure 2:
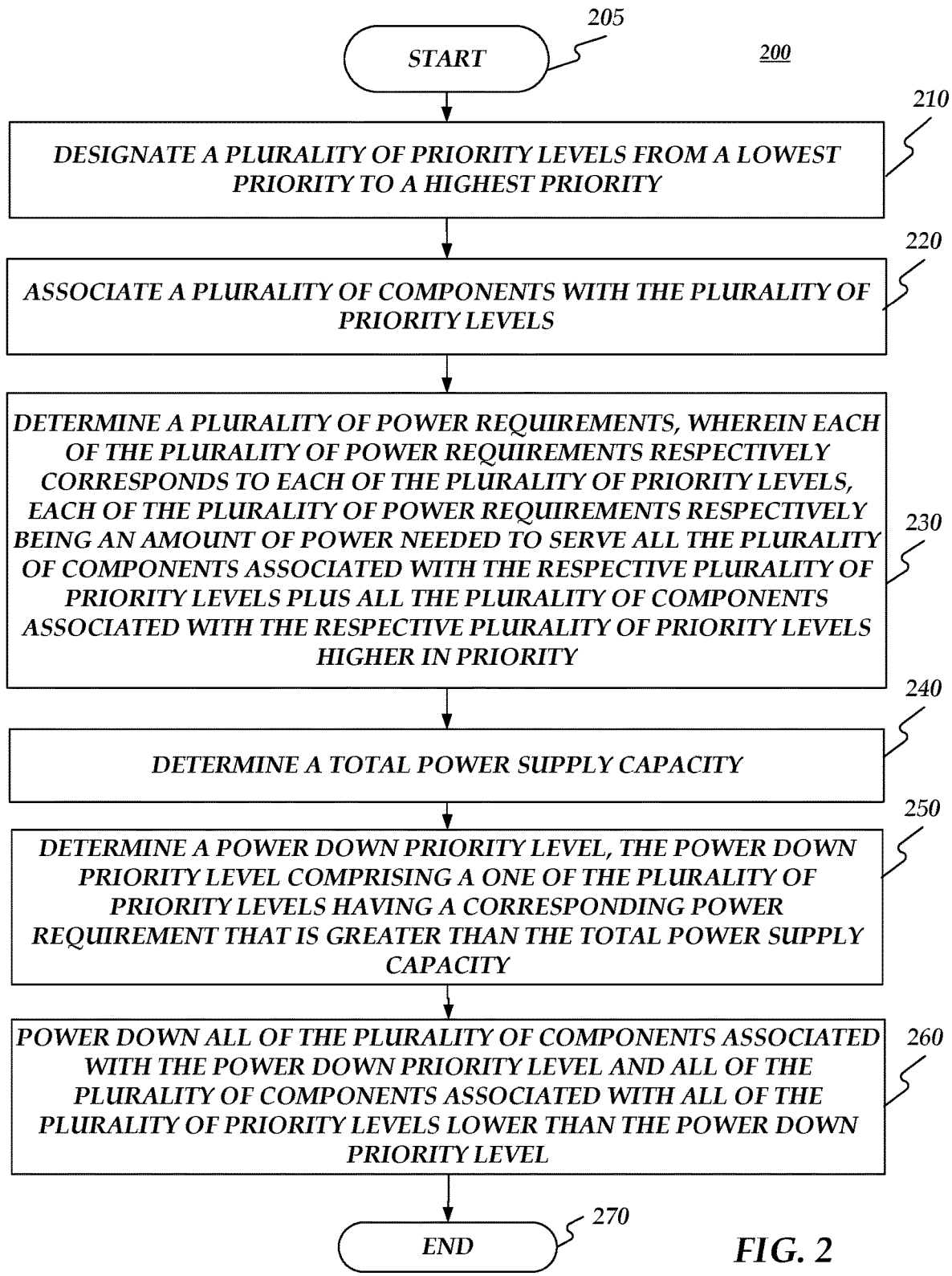
FIG. 2 is a flow chart of a method for providing power supply reliability.

FIG. 2 is a flow chart setting forth the general stages involved in a method 200 consistent with an embodiment of the invention for providing power supply reliability. Method 200 may be implemented using a computing device 500 as described in more detail below with respect to FIG. 5. Ways to implement the stages of method 200 will be described in greater detail below.

Method 200 may begin at starting block 205 and proceed to stage 210 where computing device 500 may designate a plurality of priority levels from a lowest priority to a highest priority. For example, the plurality of priority levels may comprise P1, P2, P3, P4, P5, P6, P7, and P8. P1 may comprise the highest priority level and P8 may comprise the lowest priority level. While this example has eight priority levels, embodiments of the disclosure are not limited to eight and may comprise any number of priority levels.

From stage 210, where computing device 500 designates the plurality of priority levels from the lowest priority to the highest priority, method 200 may advance to stage 220 where computing device 500 may associate a plurality of components with the plurality of priority levels. For example, as shown in Table 1, eighth line card 126 may be given priority level P8, seventh line card 124 may be given priority level P7, sixth line card 122 may be given priority level P6, fifth line card 120 may be given priority level P5, fourth line card 118 may be given priority level P4, third line card 116 may be given priority level P3, and second line card 114 may be given priority level P2. The highest priority level, P1, may be given to first line card 112 along with supervisor card 102, plurality of PoE connectors 106, and plurality of fan rows 110. The priority distribution of Table 1 is an example, and the plurality of components may be distributed in any way and are not limited to the distribution illustrated in Table 1.

TABLE 1

| Priority | Component(s) |
| --- | --- |
| P1 | First line card 112, Supervisor card 102, Plurality of PoE connectors 106, Plurality of fan rows 110 |
| P2 | Second line card 114 |
| P3 | Third line card 116 |
| P4 | Fourth line card 118 |
| P5 | Fifth line card 120 |
| P6 | Sixth line card 122 |
| P7 | Seventh line card 124 |
| P8 | Eighth line card 126 |

Once computing device 500 associates the plurality of components with the plurality of priority levels in stage 220, method 200 may continue to stage 230 where computing device 500 may determine a plurality of power requirements. Each of the plurality of power requirements may respectively correspond to each of the plurality of priority levels. Each of the plurality of power requirements may respectively be an amount of power needed to serve all the plurality of components associated with the respective plurality of priority levels plus all the plurality of components associated with the respective plurality of priority levels higher in priority.

For example, Table 2 illustrates the power requirement of each component at a given priority level of Table 1 and including all priority numbers from P1 up until each corresponding priority level. For example, the power requirement for each line card in plurality of line cards 104 may equal 350 W, the power requirement for supervisor card 102 may equal 700 W, the power requirement for each PoE connector in plurality of PoE connectors 106 may equal 60 W, and the power requirement for each fan row in plurality of fan rows 110 may equal 200 W. Accordingly, the total power requirements for the first row of Table 2 is 350 W (first line card 112)+700 W (supervisor card 102)+60 W (first PoE connector 128)+60 W (second PoE connector 130)+60 W (third PoE connector 132)+200 W (first fan row 150)+200 W (second fan row 152)+200 W (third fan row 154)=1830 W. Each successive row in Table 2 goes up by 350 W by the addition of a line card to each corresponding priority level. The aforementioned power requirements are examples and embodiments of the disclosure are not limited to these power requirements.

TABLE 2

| Priority | Power Requirements |
| --- | --- |
| P1 | 1,830 W |
| P1 + P2 | 2,180 W |
| P1 + P2 + P3 | 2,530 W |
| P1 + P2 + P3 + P4 | 2,880 W |
| P1 + P2 + P3 + P4 + P5 | 3,230 W |
| P1 + P2 + P3 + P4 + P5 + P6 | 3,580 W |
| P1 + P2 + P3 + P4 + P5 + P6 + P7 | 3,930 W |
| P1 + P2 + P3 + P4 + P5 + P6 + P7 + P8 | 4,280 W |

After computing device 500 determines the plurality of power requirements in stage 230, method 200 may proceed to stage 240 where computing device 500 may determine a total power supply capacity. For example, the power supply capacity of each power supply in plurality of power supplies 108 may equal 1,570 W. The aforementioned the power supply capacity is an example and embodiments of the disclosure are not limited to the power supply capacity. Consequently, if all eight power supplies in plurality of power supplies 108 are up and running, then the total power supply capacity (on the power supply bus) may be 8×1570 W=12,560 W. However, if only two of the power supplies in plurality of power supplies 108 are up and running, then the total power supply capacity (on the power supply bus) may be 2×1570 W=3,140 W.

From stage 240, where computing device 500 determines the total power supply capacity, method 200 may advance to stage 250 where computing device 500 may determine a power down priority level. The power down priority level may comprise a one of the plurality of priority levels having a corresponding power requirement that is greater than the total power supply capacity. In the aforementioned example, if only two of the power supplies in plurality of power supplies 108 are up and running, then the total power supply capacity (on the power supply bus) may be 2×1,570 W=3,140 W. In this example, the power down priority level may comprise P5 because two power supplies (e.g., 3,140 W) can support all devices at priority levels P1 up to P4. It may not support up to P5 because this may require 3,230 W (as shown in Table 2), which is greater than 3,140 W.

Once computing device 500 determines the power down priority level in stage 250, method 200 may continue to stage 260 where computing device 500 may power down all of the plurality of components associated with the power down priority level and all of the plurality of components associated with all of the plurality of priority levels lower than the power down priority level. In the aforementioned, example, fifth line card 120, sixth line card 122, seventh line card 124, and eighth line card 126 may be powered down because they correspond to lower priority levels and keeping these lower priority components up would exceed the total power supply capacity for this example.

Once computing device 500 powers down all of the plurality of components associated with the power down priority level and all of the plurality of components associated with all of the plurality of priority levels lower than the power down priority level in stage 260, method 200 may then end at stage 270.

Figure 3:
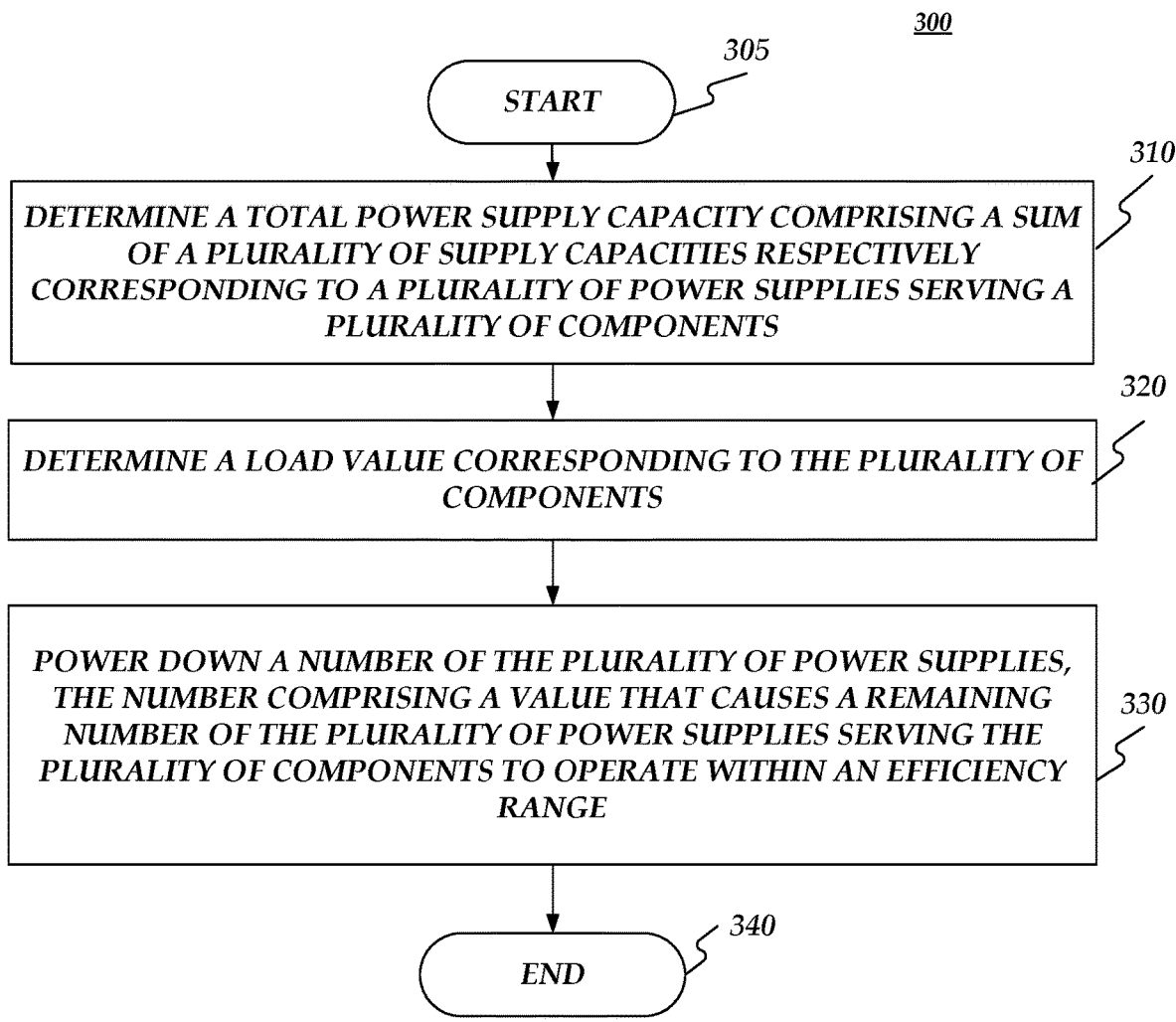
FIG. 3 is a flow chart of a method for providing power supply efficiency.

FIG. 3 is a flow chart setting forth the general stages involved in a method 300 consistent with an embodiment of the invention for providing power supply efficiency. Method 300 may be implemented using a computing device 500 as described in more detail below with respect to FIG. 5. Ways to implement the stages of method 300 will be described in greater detail below.

Method 300 may begin at starting block 305 and proceed to stage 310 where computing device 500 may determining a total power supply capacity comprising a sum of a plurality of supply capacities respectively corresponding to a plurality of power supplies serving a plurality of components. For example, first power supply 134, second power supply 136, and third power supply 138 may be online and feeding the power supply bus. Fourth power supply 140, fifth power supply 142, sixth power supply 144, seventh power supply 146, and eighth power supply 148 may be off or may have been removed from modular chassis system 100. Accordingly, the total power supply capacity in this example may comprise 3×1,570 W=4,710 W (e.g., 1,570 W for each power supply feeding the power supply bus).

From stage 310, where computing device 500 determines the total power supply capacity, method 300 may advance to stage 320 where computing device 500 may determine a load value corresponding to the plurality of components. For example, first line card 112, supervisor card 102, plurality of PoE connectors 106, plurality of fan rows 110, second line card 114, third line card 116, and fourth line card 118 may be running and thus may comprise the plurality of components. However, fifth line card 120, sixth line card 122, seventh line card 124, and eighth line card 126 may be off or may have been removed from modular chassis system 100 and thus may not be included in the plurality of components. In this example, the load value corresponding to the plurality of components may comprise 2,880 W (e.g., the sum of the power requirement for each of the plurality of components).

Once computing device 500 determines the load value corresponding to the plurality of components in stage 320, method 300 may continue to stage 330 where computing device 500 may power down a number of the plurality of power supplies. The number may comprise a value that causes a remaining number of the plurality of power supplies serving the plurality of components to operate within an efficiency range. For example, the load value corresponding to the plurality of components divided by the total power supply capacity may comprise the level at which the power supplies are running. In this aforementioned example, this may comprise 2,880 W/4,710 W=61.15%. This may not comprise an efficient level at which to run the power supplies. If one of the currently online power supplies (e.g., first power supply 134, second power supply 136, or third power supply 138) were turned off, this may force the remaining two power supplies to run in a more efficient range. Accordingly, computing device 500 may power down one of first power supply 134, second power supply 136, or third power supply 138. Consistent with embodiments of the disclosure, this more efficient range may comprise, but is not limited to, between 70% and 90%. Once computing device 500 powers down the number of the plurality of power supplies in stage 330, method 300 may then end at stage 340.

Figure 4:
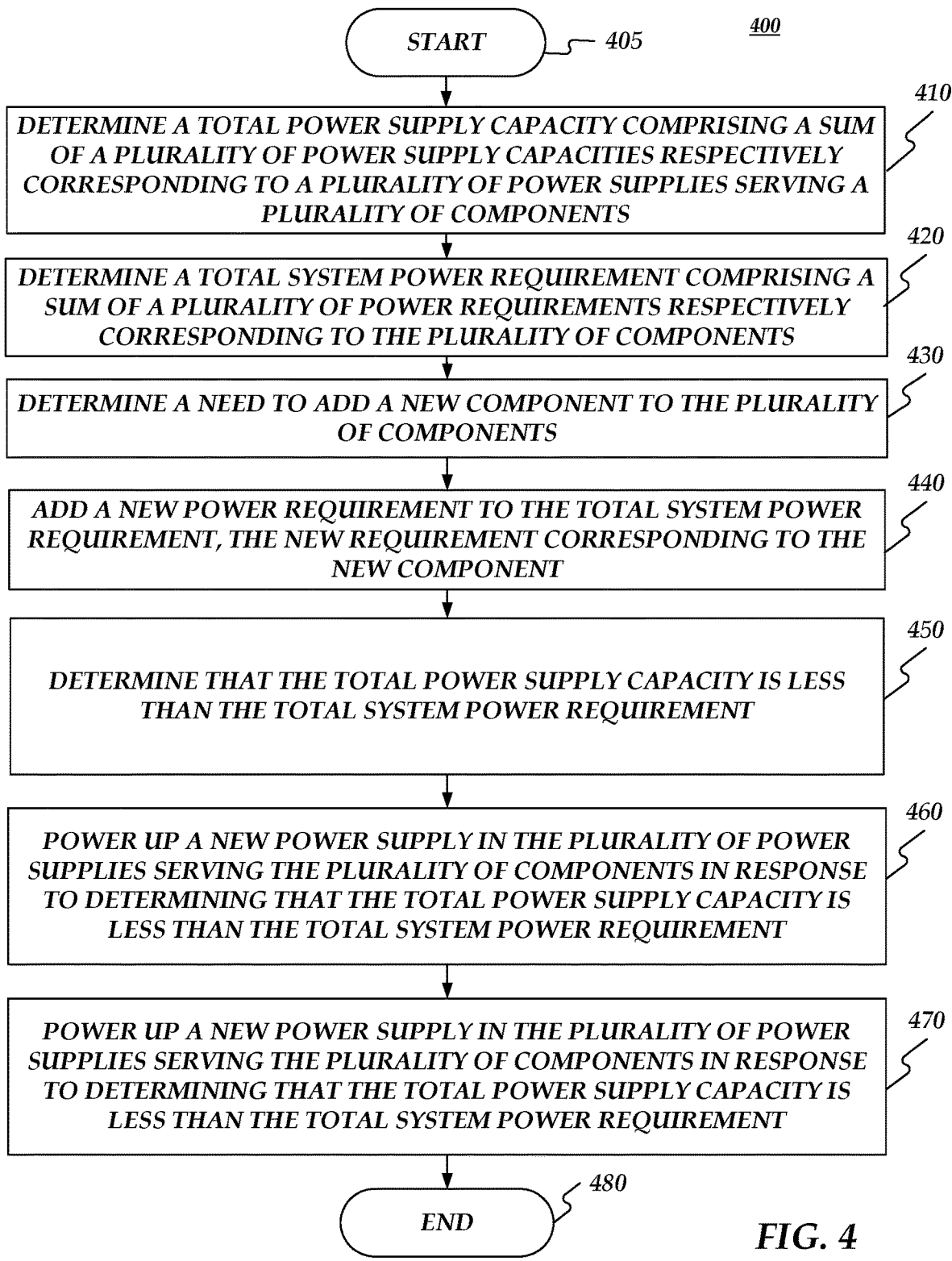
FIG. 4 is a flow chart of a method for providing power supply management based on thermal changes.

FIG. 4 is a flow chart setting forth the general stages involved in a method 400 consistent with an embodiment of the invention for providing power supply management based on thermal changes. Method 400 may be implemented using a computing device 500 as described in more detail below with respect to FIG. 5. Ways to implement the stages of method 400 will be described in greater detail below.

Method 400 may begin at starting block 405 and proceed to stage 410 where computing device 500 may determine a total power supply capacity comprising a sum of a plurality of power supply capacities respectively corresponding to a plurality of power supplies serving a plurality of components. For example, first power supply 134 and second power supply 136 may be online and feeding the power supply bus. Accordingly, the total power supply capacity in this example may comprise 2×1,570 W=3,140 W (e.g., 1,570 W for each power supply feeding the power supply bus).

From stage 410, where computing device 500 determines the total power supply capacity, method 400 may advance to stage 420 where computing device 500 may determine a total system power requirement comprising a sum of a plurality of power requirements respectively corresponding to the plurality of components. For example, first line card 112, supervisor card 102, plurality of PoE connectors 106, second line card 114, third line card 116, fourth line card 118, fifth line card 120, and sixth line card 122 may be running and thus may comprise the plurality of components. In this example, the load value corresponding to the plurality of components may comprise 2,980 W (e.g., the sum of the power requirement for each of the plurality of components). Accordingly, the total system power requirement may comprise 2,980 W.

Once computing device 500 determines the total system power requirement in stage 420, method 400 may continue to stage 430 where computing device 500 may determine a need to add a new component to the plurality of components. For example, computing device 500 may detect a temperature rise in the area served by second fan row 152. Accordingly, computing device 500 may determine a need to turn on second fan row 152 and add this new component to the plurality of components.

After computing device 500 determines the need to add the new component to the plurality of components in stage 430, method 400 may proceed to stage 440 where computing device 500 may add a new power requirement to the total system power requirement. The new requirement may correspond to the new component. For example, the power requirement for second fan row 152 may comprise 200 W. Consequently, computing device 500 may add this new power requirement of 200 W to the total system power requirement bring it up to 3,180 W.

From stage 440, where computing device 500 adds the new power requirement to the total system power requirement, method 400 may advance to stage 450 where computing device 500 may determine that the total power supply capacity is less than the total system power requirement. For example, computing device 500 may compare the total power supply capacity of 3,140 W to the total system power requirement of 3,180 W and determine that the total power supply capacity of 3,140 W is less than the total system power requirement of 3,180 W.

Once computing device 500 determines that the total power supply capacity is less than the total system power requirement in stage 450, method 400 may continue to stage 460 where computing device 500 may power up a new power supply in the plurality of power supplies serving the plurality of components in response to determining that the total power supply capacity is less than the total system power requirement. For example, computing device 500 may power up third power supply 138 to bring the total power supply capacity from 3,140 W to 4,710 W.

After computing device 500 powers up the new power supply in stage 460, method 400 may proceed to stage 470 where computing device 500 may power up the new component in the plurality of components in response to powering up the new power supply. For example, with the total power supply capacity now at 4,710 W, computing device 500 may turn on second fan row 152 because there now is enough capacity in the total power supply capacity to serve this addition. Once computing device 500 powers up the new component in stage 470, method 400 may then end at stage 480.

Figure 5:
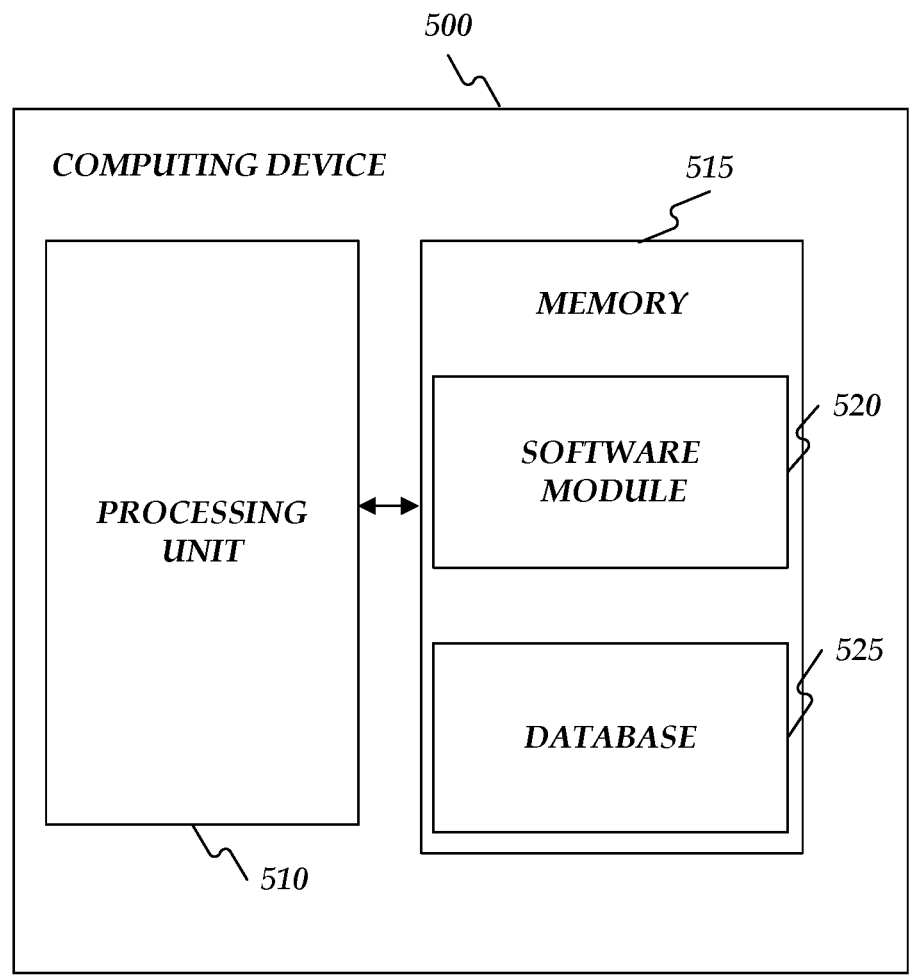
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform the processes described above with respect to FIG. 2, FIG. 3, and FIG. 4.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where some or many of the components illustrated in FIG. 5 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by a computing device, a total power supply capacity comprising a sum of a plurality of supply capacities respectively corresponding to a plurality of power supplies serving a plurality of components;
   determining a load value corresponding to the plurality of components; and
   powering down a number of the plurality of power supplies, the number comprising a value that causes a remaining number of the plurality of power supplies serving the plurality of components to operate within an efficiency range, wherein powering down the number of the plurality of power supplies comprises:
   determining a current efficiency comprising the load value corresponding to the plurality of components divided by the total power supply capacity respectively corresponding to the plurality of power supplies serving the plurality of components;
   determining that the current efficiency is not in the efficiency range;
   powering down a first power supply of the plurality of power supplies;
   determining, after powering down the first power supply, the current efficiency comprising the load value corresponding to the plurality of components divided by the total power supply capacity respectively corresponding to the remaining number of the plurality of power supplies serving the plurality of components; and
   determining, after powering down the first power supply, that the current efficiency is in the efficiency range.

2. The method of claim 1, wherein powering down the number of the plurality of power supplies, the number comprising the value that causes the remaining number of the plurality of power supplies serving the plurality of components to operate within the efficiency range comprises powering down the number of the plurality of power supplies wherein the efficiency range comprises between 70% and 90%.

3. The method of claim 1, wherein determining the load value corresponding to the plurality of components comprises determining the load value corresponding to the plurality of components wherein the plurality of components are disposed in a chassis.

4. The method of claim 1, wherein determining the load value corresponding to the plurality of components comprises determining the load value corresponding to the plurality of components wherein at least one of the plurality of components comprises a supervisor card.

5. The method of claim 1, wherein determining the load value corresponding to the plurality of components comprises determining the load value corresponding to the plurality of components wherein ones of the plurality of components comprise line cards.

6. The method of claim 1, wherein determining the load value corresponding to the plurality of components comprises determining the load value corresponding to the plurality of components wherein at least one of the plurality of components comprises a fan row.

7. The method of claim 1, wherein determining the load value corresponding to the plurality of components comprises determining the load value corresponding to the plurality of components wherein at least one of the plurality of components comprises a Power over Ethernet (PoE) connector.

8. A system comprising:
   a memory storage; and
   a processing unit coupled to the memory storage, wherein the processing unit is operative to:
   determine a total power supply capacity comprising a sum of a plurality of supply capacities respectively corresponding to a plurality of power supplies serving a plurality of components;
   determine a load value corresponding to the plurality of components; and
   power down a number of the plurality of power supplies, the number comprising a value that causes a remaining number of the plurality of power supplies serving the plurality of components to operate within an efficiency range wherein the processing unit being operative to power down the number of the plurality of power supplies comprises the processing unit being operative to:
   determine a current efficiency comprising the load value corresponding to the plurality of components divided by the total power supply capacity respectively corresponding to the plurality of power supplies serving the plurality of components;
   determine that the current efficiency is not in the efficiency range;
   power down a first power supply of the plurality of power supplies;
   determine, after powering down the first power supply, the current efficiency comprising the load value corresponding to the plurality of components divided by the total power supply capacity respectively corresponding to the remaining number of the plurality of power supplies serving the plurality of components; and
   determine, after powering down the first power supply, that the current efficiency is in the efficiency range.

9. The system of claim 8, wherein the processing unit being operative to power down the number of the plurality of power supplies, the number comprising the value that causes the remaining number of the plurality of power supplies serving the plurality of components to operate within the efficiency range comprises the processing unit being operative to power down the number of the plurality of power supplies wherein the efficiency range comprises between 70% and 90%.

10. The system of claim 8, wherein the processing unit being operative to determine the load value corresponding to the plurality of components comprises the processing unit being operative to determine the load value corresponding to the plurality of components wherein the plurality of components are disposed in a chassis.

11. The system of claim 8, wherein the processing unit being operative to determine the load value corresponding to the plurality of components comprises the processing unit being operative to determine the load value corresponding to the plurality of components wherein at least one of the plurality of components comprises a supervisor card.

12. The system of claim 8, wherein the processing unit being operative to determine the load value corresponding to the plurality of components comprises the processing unit being operative to determine the load value corresponding to the plurality of components wherein ones of the plurality of components comprise line cards.

13. The system of claim 8, wherein the processing unit being operative to determine the load value corresponding to the plurality of components comprises the processing unit being operative to determine the load value corresponding to the plurality of components wherein at least one of the plurality of components comprises a fan row.

14. A computer-readable medium that stores a set of instructions which when executed perform a method executed by the set of instructions comprising:
  determining, by a computing device, a total power supply capacity comprising a sum of a plurality of supply capacities respectively corresponding to a plurality of power supplies serving a plurality of components;
  determining a load value corresponding to the plurality of components; and
  powering down a number of the plurality of power supplies, the number comprising a value that causes a remaining number of the plurality of power supplies serving the plurality of components to operate within an efficiency range, wherein powering down the number of the plurality of power supplies comprises:
    determining a current efficiency comprising the load value corresponding to the plurality of components divided by the total power supply capacity respectively corresponding to the plurality of power supplies serving the plurality of components;
    determining that the current efficiency is not in the efficiency range;
    powering down a first power supply of the plurality of power supplies;
    determining, after powering down the first power supply, the current efficiency comprising the load value corresponding to the plurality of components divided by the total power supply capacity respectively corresponding to the remaining number of the plurality of power supplies serving the plurality of components; and
    determining, after powering down the first power supply, that the current efficiency is in the efficiency range.

15. The computer-readable medium of claim 14, wherein powering down the number of the plurality of power supplies, the number comprising the value that causes the remaining number of the plurality of power supplies serving the plurality of components to operate within the efficiency range comprises powering down the number of the plurality of power supplies wherein the efficiency range comprises between 70% and 90%.

16. The computer-readable medium of claim 14, wherein determining the load value corresponding to the plurality of components comprises determining the load value corresponding to the plurality of components wherein the plurality of components are disposed in a chassis.

17. The computer-readable medium of claim 14, wherein determining the load value corresponding to the plurality of components comprises determining the load value corresponding to the plurality of components wherein at least one of the plurality of components comprises a supervisor card.

18. The computer-readable medium of claim 14, wherein determining the load value corresponding to the plurality of components comprises determining the load value corresponding to the plurality of components wherein ones of the plurality of components comprise line cards.

19. The computer-readable medium of claim 14, wherein determining the load value corresponding to the plurality of components comprises determining the load value corresponding to the plurality of components wherein at least one of the plurality of components comprises a fan row.

20. The computer-readable medium of claim 14, wherein determining the load value corresponding to the plurality of components comprises determining the load value corresponding to the plurality of components wherein at least one of the plurality of components comprises a Power over Ethernet (PoE) connector.

* * * * *